United States Patent [19]
Dao

[11] 3,719,834
[45] March 6, 1973

[54] CLOCK PULSE JITTER CORRECTING CIRCUIT

[75] Inventor: Tich T. Dao, Cupertino, Calif.

[73] Assignee: Ampex Corporation, Redwood City, Calif.

[22] Filed: June 1, 1971

[21] Appl. No.: 148,350

[52] U.S. Cl. ..................307/269, 307/228, 307/268, 307/265, 307/246, 328/147, 328/164, 328/183

[51] Int. Cl. ..............................................H03k 5/13

[58] Field of Search......307/228, 246, 265, 268, 269; 328/164, 181, 183, 184, 185, 147

[56] References Cited

UNITED STATES PATENTS

| | | | |
|---|---|---|---|
| 3,577,012 | 5/1971 | Dummermuth | 307/228 X |
| 3,586,877 | 6/1971 | Aridas | 328/183 X |
| 2,923,837 | 2/1960 | Willett | 307/228 |
| 2,866,896 | 12/1958 | Stamptl | 328/164 |
| 3,109,107 | 10/1963 | Lee | 328/183 X |
| 3,397,304 | 8/1968 | Aver, Jr. | 328/183 X |
| 3,558,924 | 1/1971 | Lindell | 307/228 X |
| 3,586,878 | 6/1971 | Maxham | 307/246 X |
| 3,619,649 | 11/1971 | Hoffman | 328/183 X |
| 3,621,282 | 11/1971 | Hass | 328/183 X |

OTHER PUBLICATIONS

Martin & Pratt, "Obtaining Timing Pulses from a Ramp Waveform," IBM Tech. Dis. Bull., Vol. 4, No. 3., p. 85–86 [Aug. 1961].

*Primary Examiner*—John S. Heyman
*Attorney*—Robert G. Clay

[57] ABSTRACT

A clock jitter corrector includes a timing capacitor charged by a constant current during two clock pulse intervals. The timing capacitor is discharged by the incoming pulse at high current and fixed duration, resulting in a constant voltage discharge decrement. The resulting sawtooth wave is compared to a DC threshold, whereby the crossover points provide an output clock pulse train with constant pulse intervals. The invention may be cascaded to generate regulated clock pulses of higher frequencies.

6 Claims, 11 Drawing Figures

INVENTOR.
TICH T. DAO
BY
Robert S. Clay
ATTORNEY

THEORETICAL & UNREGULATED CLOCK PULSES

CAPACITOR CHARGE/ DISCHARGE WAVEFORM WITH 3DC THRESHOLDS

REGULATED & UNREGULATED CLOCK PULSES

CAPACITOR CHARGE/ DISCHARGE WAVEFORM

REGULATED CLOCK PULSES

INVENTOR.
TICH T. DAO
BY Robert S. Clay
ATTORNEY

CLOCK PULSE JITTER CORRECTING CIRCUIT

BACKGROUND OF THE INVENTION

1. Field of the Invention

The present invention relates to electronic time base corrector circuits and in particular to a circuit for correcting clock pulse jitter caused by mechanical and/or speed variations in a servo system.

2. Prior Art.

The precision of a digital servo is theoretically limited by the mechanical tolerance, speed, etc., of the tachometer, or by speed fluctuations of the tape, from which clock pulses are extracted. For example, in a tachometer servo system, if the tachometer pick-up points are not perfectly spaced, velocity fluctuations will occur in the generated clock pulse train. Therefore, an electronic time base corrector is required to equalize the mechanical imperfections of the tachometer.

In typical prior art servo systems, the mechanically induced time base error is corrected by introducing a separate digital time delay for each tachometer mark. That is, the consecutive, serially-received pulses from the tachometer are separated into separate channels, wherein each channel is provided with a delay line which moves each pulse forward or backward depending upon the jitter experienced. The corrected pulse train is then summed back into serial format to provide a clock train having a constant time interval between pulses.

In such system each tachometer output signal is corrected for time base error individually. However, adjustment of the various delays is very tedious, while any variation in the individual delays will destroy the regular spacing between clock pulses. Furthermore, the circuits in such a servo system are relatively complex requiring separate delay lines for each tachometer output signal, with serial-to-parallel and parallel-to serial converters, etc. In addition, such a prior art servo system provides operation in one speed only; i.e., the circuit does not correct for speed variations in, for example, the tachometer.

SUMMARY OF THE INVENTION

A timing capacitor is coupled, via a common junction, to a source of incoming unregulated clock pulses, to a constant current charge means and to a constant current discharge means. The capacitor is linearly charged by the charge means, and is discharged through a constant voltage discharge decrement via the discharge means, in response to the incoming unregulated clock pulses. The sawtooth waveform generated by the constant charge and subsequent constant decrement discharge of the timing capacitor, is compared to a selected DC voltage threshold. That is, the intervals between the successive points where the rising portions of the sawtooth waveform cross the selected threshold level, remains constant due to the geometric property of a parallelogram.

Regulated clock pulses of higher frequencies are generated by a cascade configuration of the invention circuit, employing multiple DC voltage thresholds.

DESCRIPTION OF THE PREFERRED EMBODIMENTS

Figures 1A, 1B, 1C:
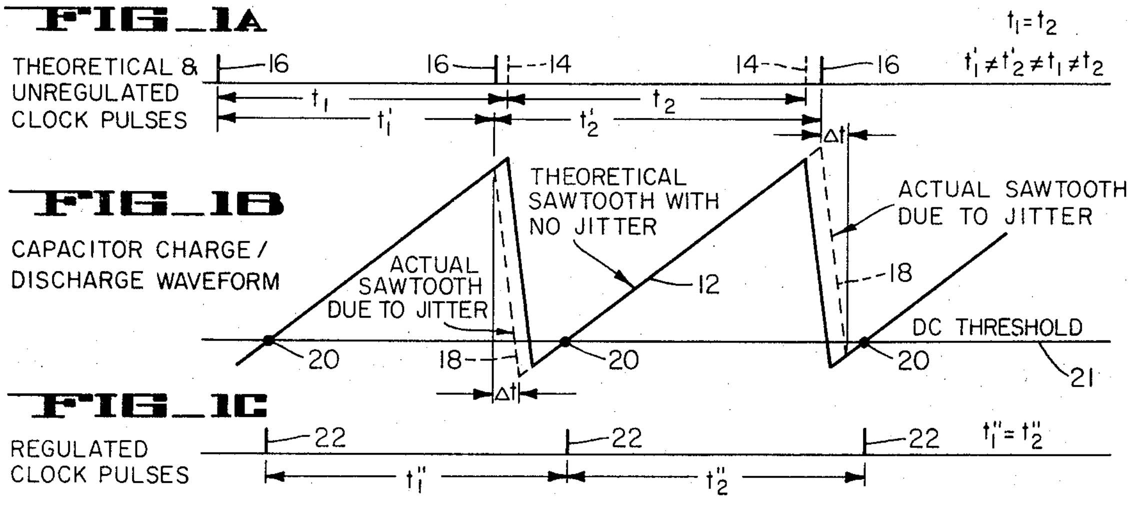
FIGS. 1A, 1B, and 1C are graphs of unregulated clock pulses, the capacitor charge/discharge sawtooth waveform, and the regulated clock pulse output respectively.

The invention circuit and function employs the geometric properties of a parallelogram. More particularly, referring to FIGS. 1A and 1B, there is shown (in solid line) an ideal or theoretical sawtooth waveform 12, corresponding to a regulated stream of clock pulses 14 of nominal frequency, exemplified here in dotted line. The actual train of clock pulses 16 (in solid line in FIG. 1A) are those which are actually delivered by a tachometer disk, clock pulses from a tape track, etc. The actual pulses are depicted with selected degrees of jitter due to the mechanical tolerance problems in fabricating a tachometer disk, speed variations of the disk or the tape, etc. The regulated clock pulses 14, corresponding to the theoretical sawtooth waveform 12, have time intervals $t_1 = t_2$, etc. However, the actual clock pulses 16 have time intervals therebetween equal to $t_1'$ and $t_2'$, wherein $t_1'$ does not necessarily equal $t_2'$, $t_1$ or $t_2$. Accordingly, the actual clock pulses 16 correspond to the actual sawtooth waveform 18 shown in phantom line in FIG. 1B. However, if the actual sawtooth waveform 18 conforms to (i.e., superimposes) the theoretical sawtooth waveform 12 along the rising voltage ramp portion thereof, the crossover points 20 determined by a selected DC voltage threshold 21 (FIG. 1B), are equally spaced apart in time. Thus the resulting regulated clock pulses 22 of FIG. 1C, which are generated at respective crossover points 20 of the rising voltage ramp portion of the sawtooth waveform, are equally space apart; i.e., $t_1'' = t_2''$ etc. for the regulated clock pulses 22, in accordance with the invention.

Therefore, a voltage sawtooth of constant slope is generated via the invention circuit, which voltage is not discharged to a fixed voltage level by the incoming unregulated clock pulses 16, but is instead discharged through a constant voltage decrement i.e., "down jump." It follows that due to the geometric property of a parallelogram, and the fact that successive discharges are equal to each other (thus equal to a constant voltage discharge decrement) the actual sawtooth indicated as numeral 18 in phantom, coincides with the theoretical sawtooth 12 along the rising voltage ramp portions thereof, with exception of the region wherein the jitter occurs between the actual unregulated clock pulses 16 and the theoretical clock pulses 14. Therefore the intervals $t_1''$, $t_2''$ . . . $t_n''$, between successive crossings 20 of the rising voltage ramp portions of the sawtooth, at the chosen DC voltage threshold 21, remains constant.

By way of further description;

$Q = CV$, wherein the charge in a capacitor is equal to the capacitance of the capacitor times the applied voltage. Accordingly $$V(t) = Q(t)/C$$

$$Q(t) = \int_0^T \frac{idt}{C}$$

and $$V(t) = IT/C$$

Accordingly it may be seen that the voltage rises linearly with the time t. Further the down jump, or voltage discharge decrement, during the capacitor discharge period ΔT is equal to $$\Delta V = (I_{discharge} \Delta T)/C$$

Figure 2:
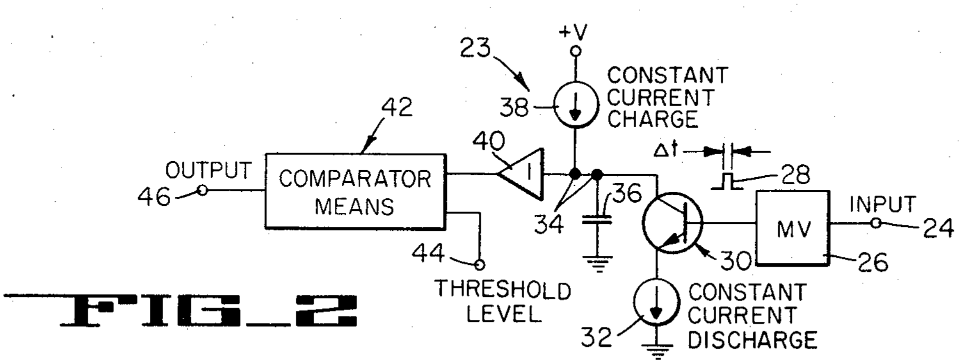
FIG. 2 is a block diagram of the invention combination.

FIG. 2 illustrates an embodiment 23 of the invention, which applies the concepts discussed in conjunction with the FIGS. 1A–C. To this end, an input terminal 24 introduces the unregulated clock pulses 16 (FIG. 1A) to a fixed one-shot multivibrator 26, which generates square pulses 28 of fixed duration ΔT. Pulses 28 are coupled to the base of a transistor 30, which defines an electronic switch means. The emitter electrode of the transistor 30 is coupled to ground via a constant current discharge means 32. The collector of transistor 30 is coupled to a common junction 34, which in turn is coupled to one side of a timing capacitor 36, and thence to ground. A constant current charge means 38 is coupled from a current source (not shown) and thence to a common junction 34.

The common junction 34 is also connected to a unity amplifier means 40, and thence to comparator means 42. A DC voltage threshold level is supplied to the comparator means 42 via an input 44. The comparator means 42 delivers a pulse via an output terminal 46 each time the rising voltage ramp portion of the sawtooth from the unity amplifier crosses the selected DC threshold 21, to provide the regulated clock pulses 22 of FIG. 1C.

Figure 3:
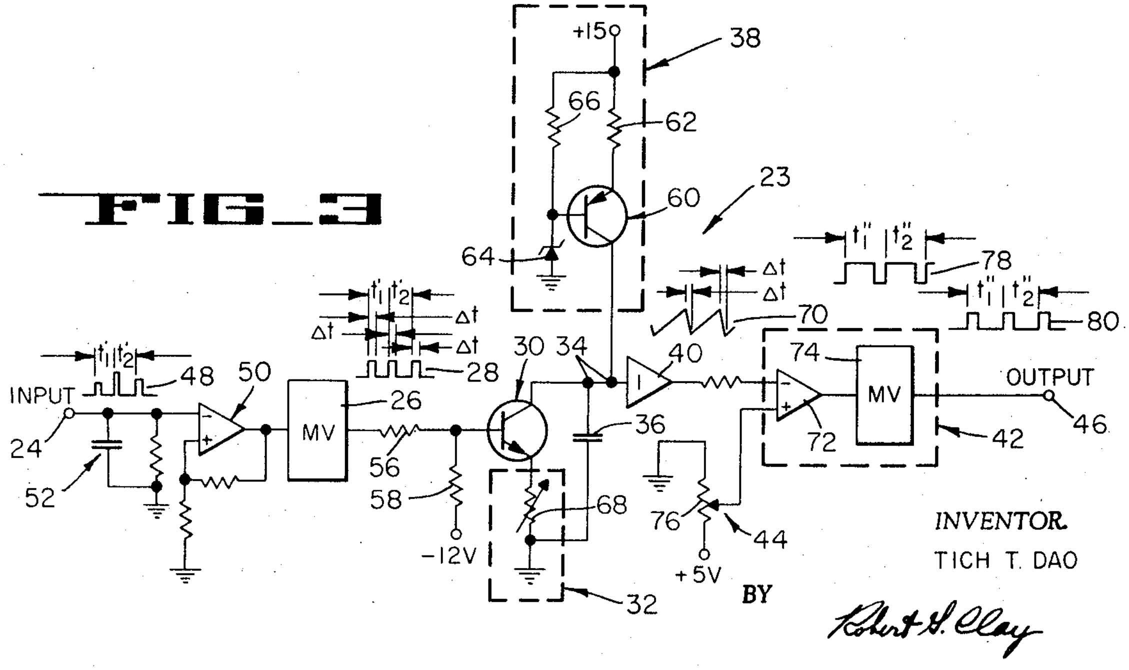
FIG. 3 is a detailed schematic diagram of the block diagram of FIG. 2.

By way of further description, FIG. 3 illustrates a further implementation of the block diagram of FIG. 2. Obviously there are various modifications which may be made within the scope of the invention, to perform the constant current charging and discharging of the timing capacitor, wherein the resulting sawtooth waveform is compared to a DC level to generate pulses at the crossover points as described above.

More particularly, referring to FIG. 3, the components 24–46 of the block diagram of FIG. 2, are similarly numbered in the two figures. Unregulated clock pulses 48, corresponding to the clock pulses 16 of FIG. 1A, are fed to input terminal 24 and thence to an operational amplifier 50 of unity gain which isolates the input from the fixed one-shot multi-vibrator 26. A filter means 52 is provided to filter out extraneous noise, etc. Note that the unregulated clock pulses 48 may be of various amplitudes and widths, as well as different intervals $t_1'$, $t_2'$. Multivibrator 26 provides the unregulated clock pulses 28 of previous mention, with time intervals $t_1'$, $t_2'$, etc., wherein however, the pulse widths are equal to $\Delta T$ and have a constant amplitude. Clock pulses 28 are introduced to the base of the transistor 30 via a resistor 56, wherein the transistor is biased via resistor 58 coupled from the base electrode to a negative voltage.

The constant current charge means 38 is herein illustrated as a transistor 60, whose emitter is coupled via a resistor 62 to a positive voltage source. The base of the transistor 60 is coupled to ground via a Zener diode 64, and thence via a resistor 66 to the positive voltage source. The collector of transistor 60 is coupled to the common junction 34. Accordingly, the constant current charge means 38 comprises a fixed current source which, in combination with the timing capacitor 36, generates a linear voltage ramp corresponding to the rising voltage ramp portion of the theoretical sawtooth waveform 12 of FIG. 1B.

The constant current discharge means 32 is illustrated here as a variable resistance 68 coupled between the emitter of transistor 30 and ground. Thus it may be seen that the voltage discharge decrement and interval is determined by the duration ΔT of the unregulated pulses 28, by their (constant) amplitude, and by the setting of the variable resistance 68. Accordingly, constant current charge means 38 provides a rising voltage ramp, whereupon introduction of the pulses 28 triggers the transistor 30 to provide a discharge path for timing capacitor 36, via the adjustable resistance 68. The discharge time corresponds to the duration $\Delta T$, whereby the timing capacitor 36 is discharged through a constant voltage decrement. The resulting sawtooth waveform is shown at 70, which waveform is introduced to the comparator means 42 via the unity gain operational amplifier 40 which provides circuit isolation.

The comparator means 42 includes a high gain, differential amplifier, herein termed a voltage comparator 72, and a one-shot multivibrator 74 similar to multivibrator 26. The DC voltage threshold of FIG. 1B is provided via the threshold level means (input) 44, comprising a variable resistance device 76 coupled between ground and a positive voltage. Thus the voltage comparator 72 compares the rising ramp portion of the sawtooth waveform 70 with the selected DC voltage threshold 21, to provide output pulses 78 with a leading edge which corresponds to the crossover of the rising ramp voltage with the DC threshold. The leading edge of the pulses 78 trigger the multivibrator 74 which, in turn, provides an output of regulated, constant amplitude, clock pulses 80 in accordance with the invention. That is, clock pulses 80 have regulated intervals therebetween of $t_1''$, $t_2''$, etc. with constant amplitude and pulse width. The multivibrator 74 provides for pulse shaping in accordance with the regulated pulses introduced thereto from the voltage comparator 72.

FIGS. 4A-4E depict waveforms and regulated and unregulated pulses of a further embodiment of the invention (FIG. 5), which generates regulated clock pulses at a frequency higher than the original unregulated clock pulses introduced to the circuit of, for example, FIGS. 2, 3. The circuit of FIG. 5 thus is particularly useful in slow speed servo systems wherein tachometer pulses are of correspondingly low frequency, which accordingly inherently provides a less accurate servo system.

Figure 4A:
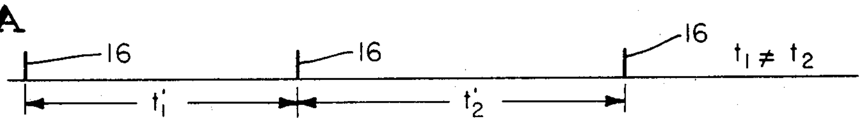
FIGS. 4A, 4B, and 4C are graphs similar to those of FIGS. 1A, B, C, depicting the waveform and pulses for a further combination of the invention shown in FIG. 5.
Figure 4B:
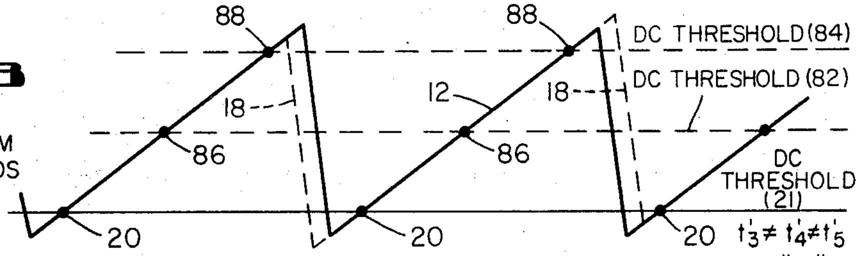
Figure 4C:
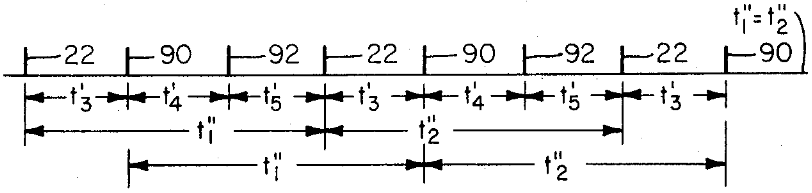

FIG. 4A shows the incoming, unregulated clock pulses 16 of FIG. 1A, wherein $t_1'$ does not necessarily equal $t_2'$. FIG. 4B shows the corresponding actual sawtooth waveform 18 generated via the invention circuit at the common junction 34, as well as the theoretical waveform 12. DC threshold 21 with crossover points 20 is also shown. FIG. 4C shows the resulting, regulated clock pulses 22 of FIG. 1C which are evenly spaced apart with $t_1'' = t_2''$.

Figure 5:
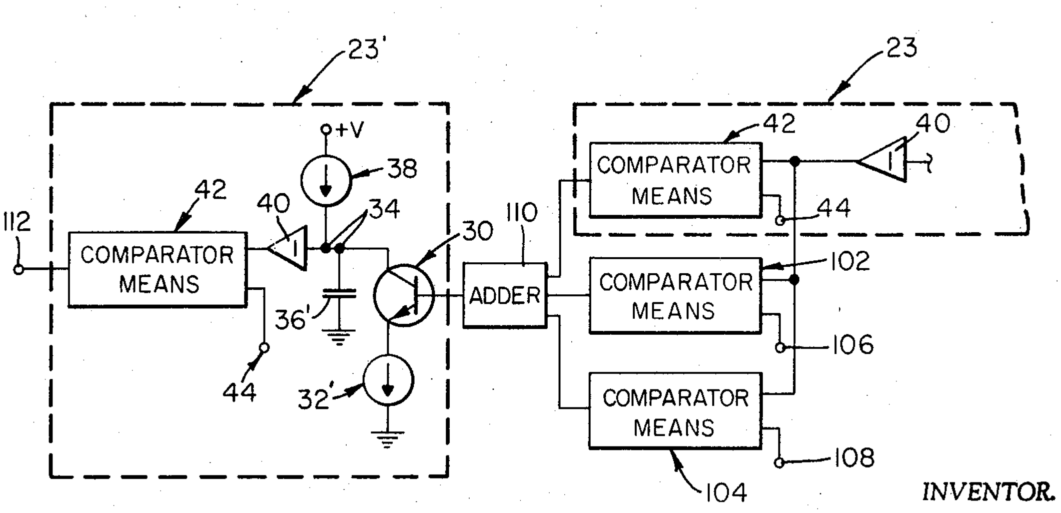
FIG. 5 is a block diagram of a further combination of the circuit of FIG. 2.

In accordance with the invention combination of FIG. 5, one or more DC threshold levels may be employed along with the original threshold 21 of previous description, to provide a multiplication of the clock pulse frequency. By way of example only, (two) DC thresholds 82 and 84 are shown here, whereby the circuit provides three times the original clock pulse 16 frequency. Accordingly, the rising voltage ramp portions of the actual sawtooth 18 are compared with the DC thresholds 82, 84 at crossover points 86, 88 respectively, as well as with original DC threshold 21. Thus additional (unregulated) clock pulses 90 and 92 are generated at crossover points 86, 88 respectively, between the original (regulated) pulses 22 of FIG. 1C. Note that although $t_1''$ is equal to $t_2''$ (i.e., clock pulses 22, 90 and 92 are regulated with respect to each other from cycle to cycle) pulse jitter may occur between the clock pulses 22 and 90, 92 since it is tedious and difficult to precisely select the threshold levels 82, 84 at voltages corresponding to exact intervals of time. Thus pulse intervals $t_3''$, $t_4''$ and $t_5''$ are not necessarily equal to each other.

Figure 4D:
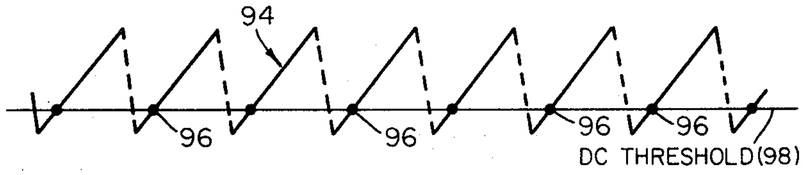

In accordance with the invention, a second circuit (23') such as that of FIGS. 2, 3 receives the regulated pulses 22 and unregulated pulses 90, 92, whereby the incoming pulses 22, 90, 92 initiate the generation of a sawtooth waveform 94 of FIG. 4D. Due to the geometric properties of a parallelogram, and the fact that the circuit via pulses 22, 90, 92 provides constant voltage decrement discharges, the crossover points 96 of the rising voltage ramp portion of the waveform 94 with a selected DC threshold 98, are equally spaced apart. Thus a regulated stream of clock pulses 100 is generated at crossover points 96; that is, clock pulse intervals $t_3''$ through $t_5''$ are all equal.

The circuit for performing the above-described multiplied frequency regulation, is shown in FIG. 5. To this end, the sawtooth waveform output of the unity amplifier 40 (in the circuit 23 of FIG. 2) is fed not only to comparator means 42, but also to additional comparator means 102 and 104 similar thereto. DC threshold 21 is supplied to comparator means 42 via input 44 as before, while DC thresholds 82, 84 are supplied to comparator means 102, 104 via inputs 106, 108 respectively. The threshold levels are provided via components similar to (44) 76 of FIG. 3. The successive square wave outputs (similar to output pulses 78) are combined via adder means 110 coupled to the outputs of means 42, 102 and 104. Accordingly, the output from adder means 110 is a train of unregulated pulses of three times the frequency of the original incoming tach pulses 16. Each of the pulses e.g., 22, 90, 92) are regulated from cycle to cycle, however adder means 110 output pulses stemming from pulses 90, 92 are not regulated relative to each other within pulse 78 intervals.

Figure 4E:
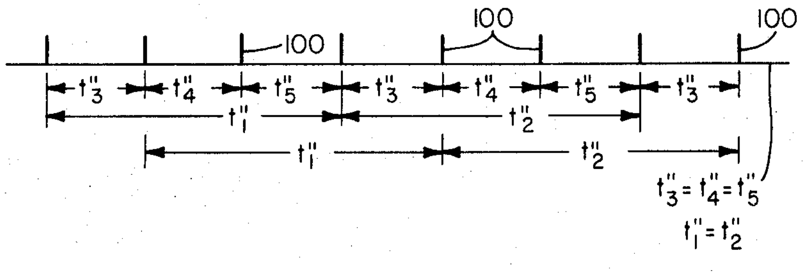

Thus a circuit 23' similar to FIG. 2, is coupled at the base of its transistor 30, defining "cascaded" circuits 23, 23' to provide regulation of the unregulated pulses in the same manner as described supra with reference to FIGS. 2, 3. The only difference between the cascaded circuit 23' of FIG. 5, and that of FIGS. 2, 3 is that the time constant for the timing capacitor 36' corresponds to the frequency of the incoming pulses from adder means 110; in this example as shown in FIG. 4E, the time constant of circuit 23' is thus one third that used in FIG. 2. The regulated clock pulses 100 of (three) times the frequency, are coupled to an output terminal 112. The intervals $t_3''$ through $t_5''$ are equal, and all clock pulses are regulated.

I claim:

1. A clock jitter corrector for correcting jitter in incoming unregulated pulses of variable amplitude and width provided by clock pulse source means, comprising the combination of;

input means for receiving the incoming unregulated clock pulses and for generating unregulated pulses of selected constant amplitude and width;

charge collecting means operatively coupled to the input means;

constant current charge means coupled to the charge collecting means to linearly charge the latter means;

constant current discharge means coupled to the charge collecting means and responsive to the unregulated pulses from the input means to discharge the charge collecting means through a selected constant voltage discharge determined by the selected constant amplitude and width of the input means pulses; and output means including means for selecting a threshold level coupled to the charge collecting means and responsive to the constant current charge means and the means for selecting the threshold level to provide a regulated stream of clock pulses when the value of the charge in the charge collecting means crosses the threshold level.

2. The clock jitter corrector of claim 1 wherein said constant current discharge means includes electronic switch means for operatively coupling said charge collecting means to ground in response to the input means unregulated pulses; the input means further including pulse forming means coupled between said unregulated clock pulses of variable amplitude and width and said electronic switch means.

3. The clock jitter corrector of claim 1 wherein said means for selecting a threshold level includes a plurality of differential amplifiers operatively coupled to the charge collecting means to provide a like plurality of selected DC thresholds respectively; adder means coupled to the differential amplifiers to sum the outputs thereof to define a stream of partially unregulated pulses; and second clock jitter corrector means coupled to the adder means in cascade configuration, including a timing capacitor with a time constant corresponding to the plurality of differential amplifiers, to provide regulated clock pulses of a higher frequency corresponding to the plurality of differential amplifiers times the original incoming unregulated pulses.

4. The clock jitter corrector of claim 2 wherein the constant current discharge means discharges the charge collector means during a constant period determined by the selected constant amplitude and width of the pulse forming means unregulated pulses.

5. The clock jitter corrector of claim 4 wherein the constant current discharge means includes a discharge transistor coupled to the charge collecting means, and variable resistor means coupled from the discharge transistor to ground.

6. The clock jitter corrector of claim 4 wherein said means for selecting a threshold level includes a differential amplifier coupled to said charge collecting means to receive the charging voltage waveform, DC voltage threshold means coupled to the differential amplifier to provide a selected DC threshold, and multivibrator means coupled to said differential amplifier and responsive thereto to generate said regulated clock pulses at the charging voltage crossovers with said DC threshold.

* * * * *